(12) United States Patent
Nemoto et al.

(10) Patent No.: US 6,422,546 B1
(45) Date of Patent: Jul. 23, 2002

(54) ACTIVE VIBRATION ISOLATING SUPPORT DEVICE

(75) Inventors: Hirotomi Nemoto; Ken Iinuma; Tsutomu Ogawa; Hideki Matsuoka; Tetsuo Mikasa; Satoshi Watanabe, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/594,709

(22) Filed: Jun. 16, 2000

(30) Foreign Application Priority Data

Jun. 18, 1999 (JP) ............................ 11-172871
Jun. 18, 1999 (JP) ............................ 11-172872
Jun. 18, 1999 (JP) ............................ 11-172873

(51) Int. Cl.$^7$ ................................. F16F 9/53
(52) U.S. Cl. ............................ 267/140.14; 267/140.15; 267/140.13
(58) Field of Search ................. 267/140.14, 140.15, 267/140.13, 140.11, 140.2, 140.4, 140.5, 292

(56) References Cited

U.S. PATENT DOCUMENTS

| | | | | |
|---|---|---|---|---|
| 5,439,204 A | * | 8/1995 | Yamazoe et al. ...... 267/140.14 |
| 5,601,280 A | * | 2/1997 | Nagaya et al. ......... 267/140.14 |
| 5,603,482 A | * | 2/1997 | Mott et al. ............... 251/129.2 |
| 5,653,427 A | * | 8/1997 | Matsuda et al. ....... 267/140.14 |
| 5,810,336 A | * | 9/1998 | Gennesseaux ......... 267/140.14 |
| 5,975,510 A | * | 11/1999 | Miyazaki ............... 267/140.15 |
| 6,241,223 B1 | * | 6/2001 | Gugsch et al. ........ 267/140.13 |

FOREIGN PATENT DOCUMENTS

| JP | 06-264955 | 9/1994 | ............ F16F/13/00 |
|---|---|---|---|
| JP | 10-110771 | 4/1998 | ............ F16F/13/26 |

* cited by examiner

Primary Examiner—Paul N. Dickson
Assistant Examiner—Melody M. Burch
(74) Attorney, Agent, or Firm—Sughrue Mion, PLLC

(57) ABSTRACT

An active vibration isolating support device for preventing the direct transmission of vibrations from an engine to a vehicle body frame includes an electromagnetic actuator for driving a movable member in a reciprocating fashion to change the capacity of a first liquid chamber. A shaft portion of an armature driven by a coil is supported by a bearing so that it moves along an axis, whereby the size of an air gap can be maintained as small as possible, thereby making it possible to miniaturize the coil. In addition, a connecting rod for connecting the movable member with the armature is supported so as to sway relative to a coil spring and a saucer spring, whereby the vibration of the movable member is prevented from being transmitted to the shaft portion of the armature.

7 Claims, 10 Drawing Sheets

ACTIVE VIBRATION ISOLATING SUPPORT DEVICE

BACKGROUND OF THE INVENTION

1. Field of the Invention

The present invention relates to an active vibration isolating support device comprising an elastic body for bearing the load of a vibratory body, a liquid chamber at least partially constituted by said elastic body, a movable member for changing the capacity of the liquid chamber and an actuator for driving an armature connected to the movable member by virtue of an electromagnetic force produced by a coil.

2. Description of the Related Art An active vibration isolating support device as described above is known in Japanese Patent Unexamined Publication No. Hei. 10-110771(JP-A-10-110771).

In this active vibration isolating support device, the movable member for changing the capacity of the liquid chamber is constituted by a disc-like plate spring secured to a case around the periphery thereof, and the armature driven by the coil of the actuator does not have any specific bearing and is supported directly on a lower surface of the movable member at a central portion thereof. The armature is then constructed so as to be attracted by exciting the coil, and the movable member integrally joined to the armature is reciprocated in directions along the axis of the device.

In this active vibration isolating support device, in addition, a driving signal is calculated based on a reference signal outputted every time a crank shaft rotates through a predetermined angle and a residual vibration signal transmitted from the engine to the frame of the vehicle body via the active vibration isolating support device, and the actuator is constructed so to be feedforward controlled.

In this conventional active vibration isolating support device, when the movable member for changing the capacity of the liquid chamber is deviated from the axis of the device by a biassed load the movable member receives from the liquid in the liquid chamber, since the armature is not supported by a bearing, the armature made integral with the movable member is also inclined. Thus, an air gap needs to be set so wide as to avoid a risk of the armature being brought into contact with a yoke even if it is inclined, this resulting in deterioration of the characteristics of the magnetic circuit. To solve this problem, the magnetic force to be generated may be increased by enlarging the coil, but such a construction leads to increase in power consumption of the coil.

To cope with this, it is then considered to avoid a contact between the inclined armature and the yoke by supporting the armature by a bearing such that the armature moves along the axis of the device, but such a construction generates pinching between the armature and the bearing due to a biassed load imparted by the movable member, and it leads to a problem that the bearing wears too early, whereby the durability of the actuator is reduced.

In addition, since the conventional active vibration isolating support device is provided with no means for verifying the operational amount of the armature, even if the actuator fails and becomes out of order or the actuator gets deteriorated and the operational amount thereof is reduced, there is no way of detecting such an abnormal state, and this may result in a problem that the active vibration isolating support device cannot perform as originally designed. Furthermore, since the operational amount of the actuator cannot be detected, the operation of the actuator cannot be feedback controlled, and this results in a problem that control with high accuracy is made difficult.

SUMMARY OF THE INVENTION

The present invention was made in view of the aforesaid situation and an object of the invention is to provide an active vibration isolating support device which can reduce the power consumption thereof without deteriorating the durability of the actuator for driving the movable member.

In addition, the other object of the invention is to provide an active vibration isolating support device which can ensure the detection of the abnormal state of the actuator.

With a view to attaining the objects, according to a first aspect of the invention, there is provided an active vibration isolating support device comprising an elastic body for bearing the load of a vibratory body, a liquid chamber at least partially constituted by the elastic body, a movable member adapted to change the capacity of the liquid chamber, and an actuator for driving an armature connected to the movable member by virtue of an electromagnetic force produced by a coil, the active vibration isolating support device has the armature which is supported by a bearing, wherein the armature and the movable member are connected to each other in a flexible fashion, and are accommodated to be bent.

According to the above construction, since the armature of the actuator is supported by the bearing, the vibration of the armature can be prevented, whereby an optimum air gap can be set for the actuator, thereby making it possible to miniaturize the coil to thereby reduce the power consumption. Moreover, since the armature and the movable member are connected to each other in a flexible fashion, even if there occurs a vibration of the movable member due to the load imparted by the liquid chamber, the vibration is not directly transmitted to the armature, whereby biassed wearing of the bearing can be prevented, thereby making it possible to improve the durability and reliability of the actuator.

In addition, according to a second aspect of the invention, there is provided an active vibration isolating support device comprising an elastic body for bearing the load of a vibratory body, a liquid chamber at least partially constituted by the elastic body, a movable member adapted to change the capacity of the liquid chamber, and an actuator for driving an armature connected to the movable member by virtue of an electromagnetic force produced by a coil, the active vibration isolating support device being characterized in that the armature supported by the bearing and the movable member are adapted to be brought into contact with each other at a contact portion in such a manner as to be displaced relative to each other and that the armature is adapted to press drive the movable member via the contact portion when the armature is attracted by the coil when the coil is excited.

According to the above construction, since the armature of the actuator is supported by the bearing, the vibration of the armature can be prevented, whereby the optimum air gap can be set for the actuator and consequently, the coil can be miniaturized to thereby reduce the power consumption. Moreover, since the armature and the movable member are brought into contact with each other via the contact portion such that they can be displaced relative to each other, even if the vibration of the movable member is generated by the load imparted thereto by the liquid chamber, the vibration is constructed so as not to directly be transmitted to the armature, whereby the biassed wear of the bearing can be prevented, thereby making it possible to improve the durability and reliability of the actuator. Furthermore, since the armature press drives the movable member via the contact portion, the deviation of the armature from the movable member can be prevented, whereby the movable member can securely be driven.

An engine E that will be described in first and second modes for carrying out the invention corresponds to the vibratory body described in the above first and second aspects of the invention, a first elastic body in the first and second modes for carrying out the invention corresponds to the elastic body discussed in the above first and second aspects, and a first liquid chamber in the first and second modes corresponds to the liquid chamber of the above aspects of the invention.

Furthermore, according to a third aspect of the invention, there is provided an active vibration isolating support device comprising an elastic body for bearing the load of a vibratory body, a liquid chamber at least partially constituted by the elastic body, a movable member adapted to change the capacity of the liquid chamber, and an actuator for driving an armature connected to the movable member by virtue of an electromagnetic force produced by a coil, the active vibration isolating support device has a operational amount detecting means for detecting an operational amount of the actuator.

According to the above construction, since the operational amount of the actuator of the active vibration isolating support device is detected by the operational amount detecting means, not only can an abnormal state be securely detected in which the actuator fails and becomes out of order or in which the actuator becomes deteriorated and the operational amount thereof is reduced but also a feedback control can be performed in which a detected operational amount is made to coincide with a target value.

An engine E that will be described in a third mode for carrying out the invention corresponds to the vibratory body described in the above third aspect of the invention, a first liquid chamber in the third mode corresponds to the liquid chamber of the above third aspect, and a lift amount sensor to be described in the third mode corresponds to the operational amount detecting means discussed in the above third aspect of the invention.

DETAILED DESCRIPTION OF THE PREFERED EMBODIMENT

Modes for carrying out the invention will be described below based on embodiments illustrated in the accompanying drawings.

Figure 1:
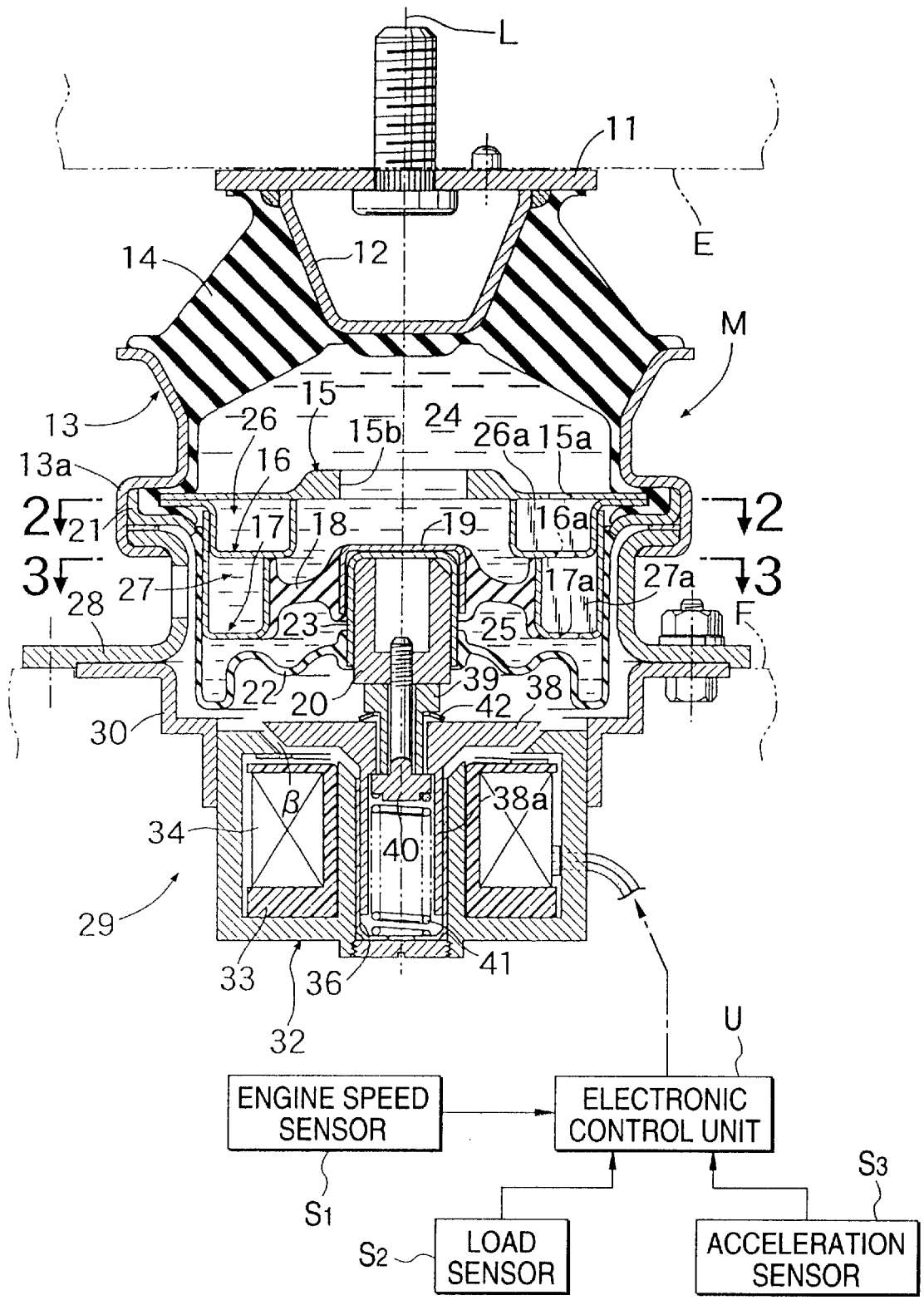
FIG. 1 is a vertical sectional view of an active vibration isolating support device according to a first mode for carrying out the invention.
Figure 2:
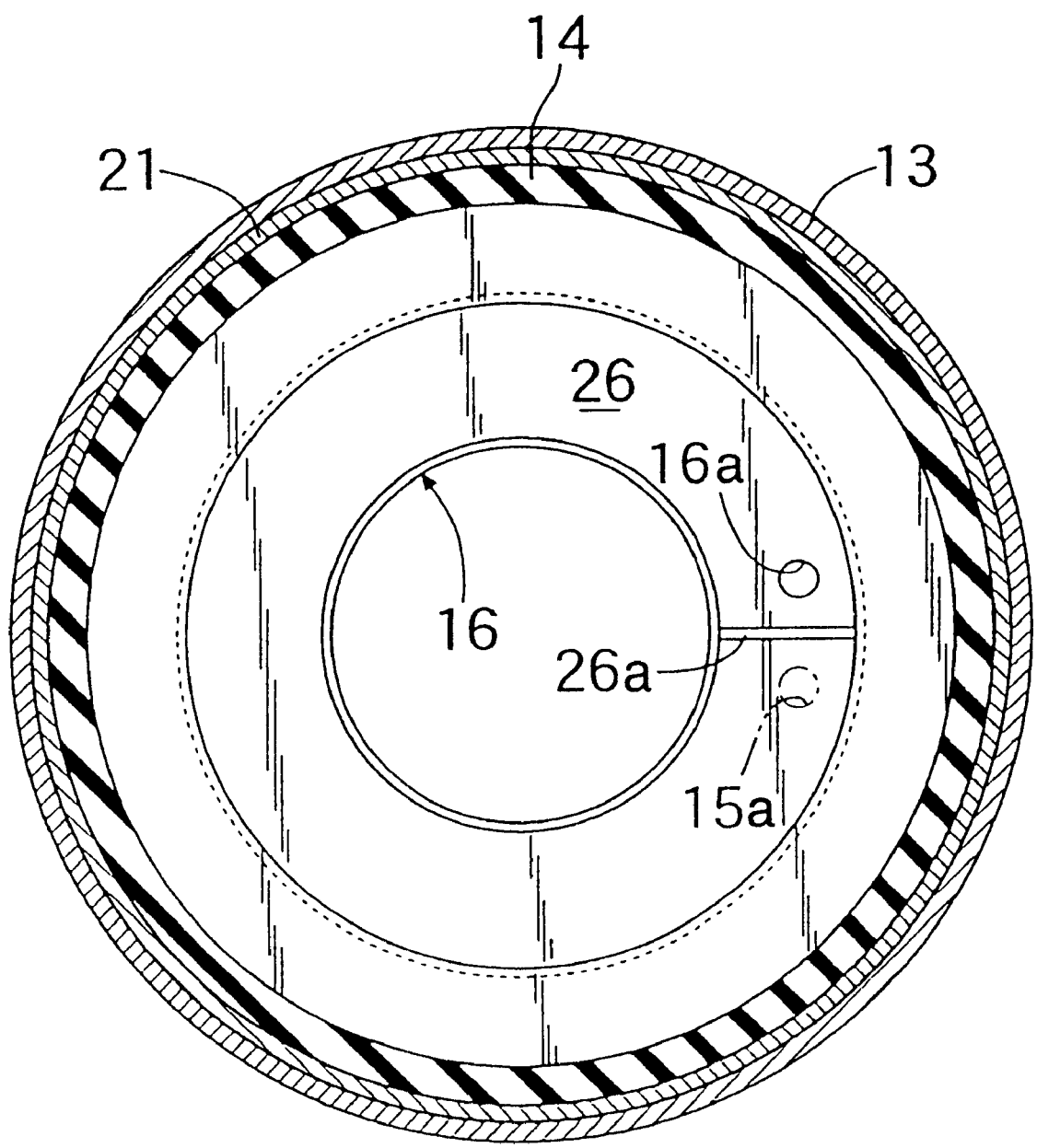
FIG. 2 is a cross-sectional view taken along the line 2—2 of FIG. 1.
Figure 3:
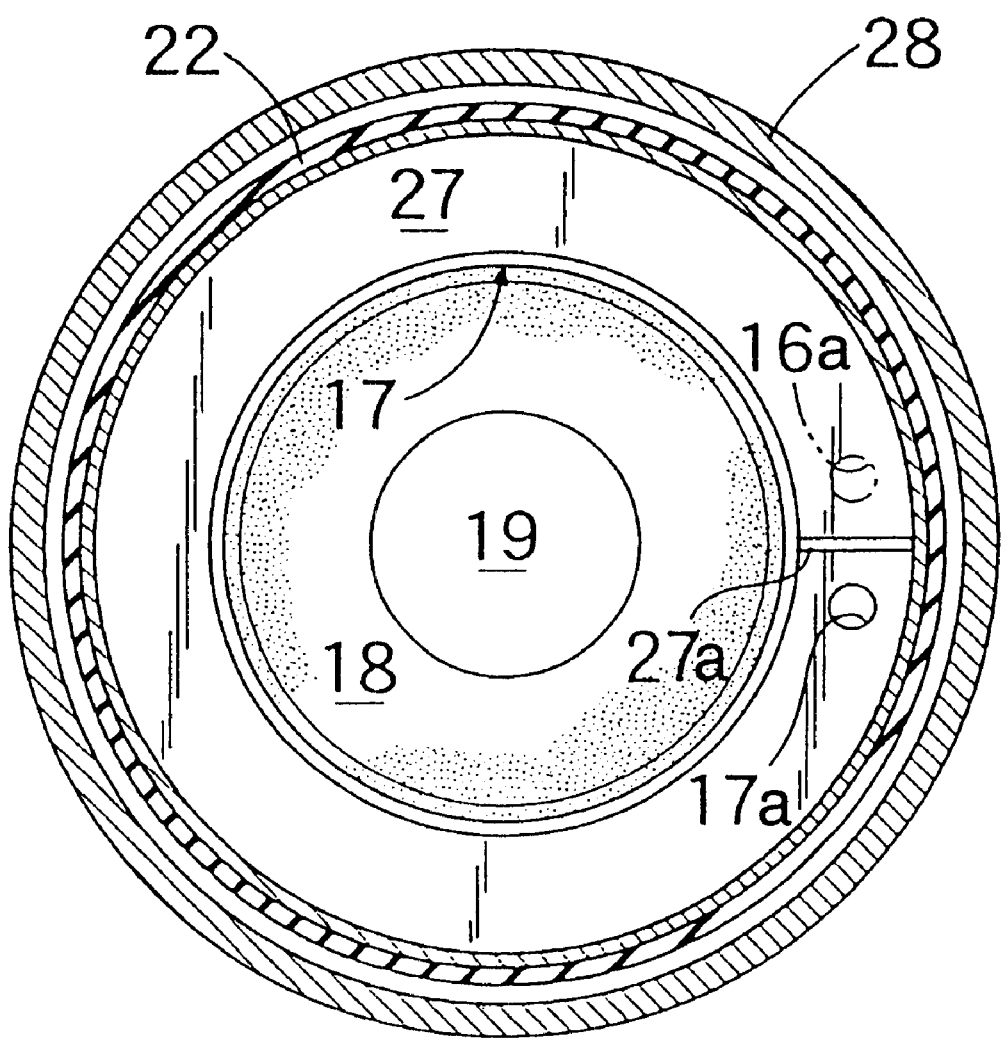
FIG. 3 is a cross-sectional view taken along the line 3—3 of FIG. 1.
Figure 4:
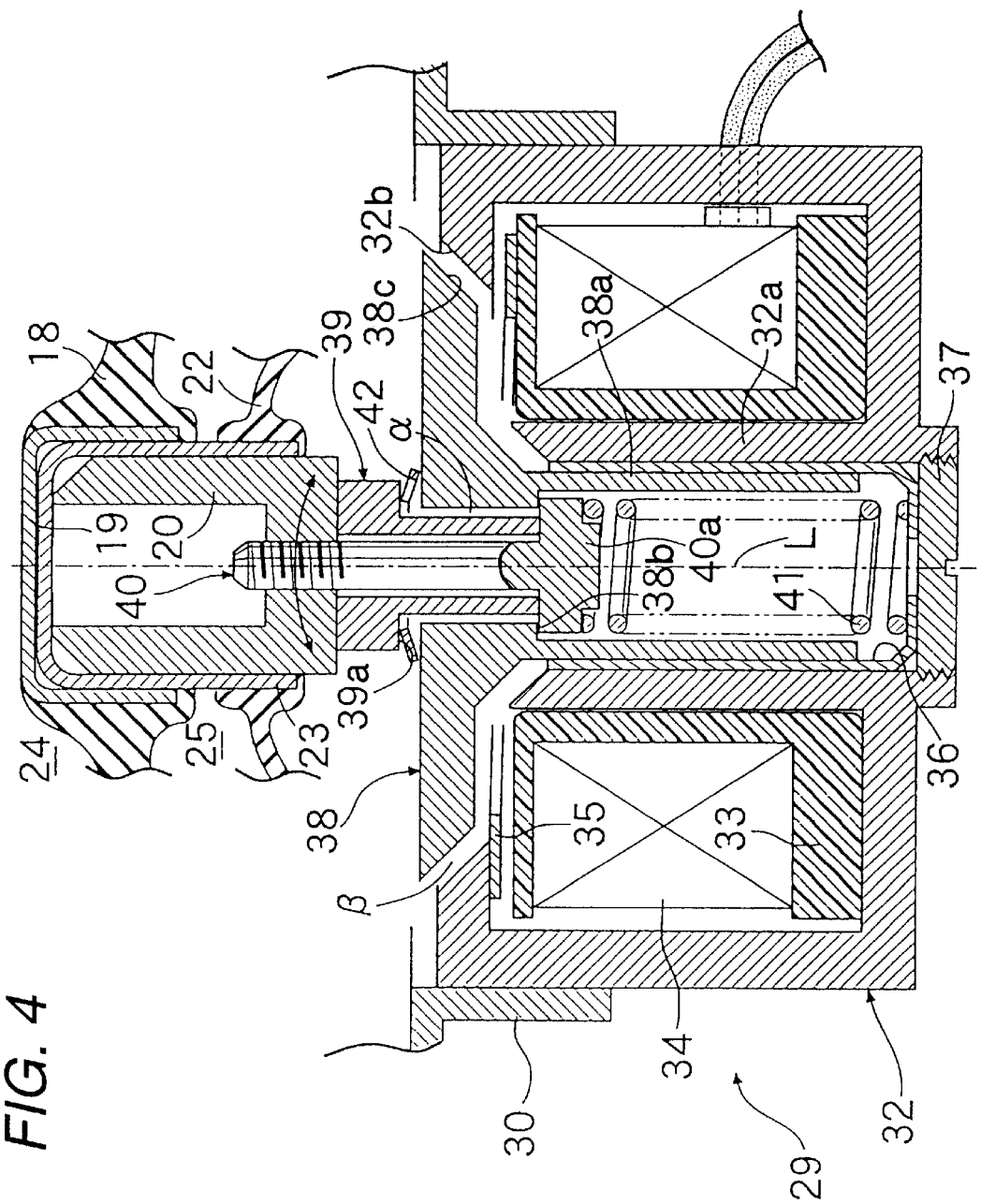
FIG. 4 is an enlarged view of a main part of FIG. 1.

FIGS. 1 to 4 show a first mode for carrying out the invention, in which FIG. 1 is a vertical sectional view of the invention, FIG. 2 is a cross-sectional view taken along the line 2—2 of FIG. 1, FIG. 3 is a cross-sectional view taken along the line 3—3 of FIG. 1, and FIG. 4 is an enlarged view of a main part of FIG. 1.

An active vibration isolating support device M shown in FIGS. 1 to 4 is intended to be used for elastically supporting an engine E on a vehicle body frame F of an automobile and is controlled by an electronic control unit U to which are connected an engine speed sensor S1 for detecting the engine speed, a load sensor S2 for detecting a load to be inputted in the active vibration isolating support device M and an acceleration sensor S3 for detecting an acceleration applied to the engine E.

The active vibration isolating support device M has a substantially axial symmetric construction relative to an axis L and comprises an inner barrel 12 welded to a plate-like mounting bracket 11 joined to the engine E and an outer barrel or housing 13 disposed concentrically around the outer circumference of the internal barrel 12. A first elastic body 14 formed of a thick rubber is joined through vulcanization bonding to the inner barrel 12 and the outer barrel 13 at upper and lower ends thereof, respectively. Made integral with each other through welding are a first disc-like orifice forming member 15 having an opening 15b in the center thereof, a second annular orifice forming member 16 which is left open at an upper side thereof and therefore has a tub-like section, and a third annular orifice forming member 17 which is also left open at an upper side thereof and therefore has a tub-like section, and peripheral portions of the first orifice forming member 15 and the second orifice forming member 16 are overlapped each other and are fixed at a caulk fixed portion 13a provided at a lower portion of the outer barrel 13.

A second elastic body 18 formed of a rubber film is fixed to an inner circumference of the third orifice forming member 17 at an outer circumference thereof through vulcanization bonding, and a cap member 19 fixed through vulcanization bonding to an inner circumference of the second elastic body 18 is fixed through press fit to a movable member 20 disposed vertically movably on the axis L. A diaphragm 22 is fixed at an outer circumference thereof through vulcanization bonding to a ring member 21 fixed to the caulk fixed portion 13a of the outer barrel 13, and a cap member 23 fixed to an inner circumference of the diaphragm 22 through vulcanization bonding is fixed through press fit to the movable member 20.

Thus, a first liquid chamber 24 is defined between the first elastic body 14 and the second elastic body 18 in which liquid is sealed, and a second liquid chamber 25 is defined between the second elastic body 18 and the diaphragm 22 in which liquid is sealed. These first liquid chamber 24 and second liquid chamber 25 are then caused to communicate with each other via an upper orifice 26 and a lower orifice 27 which are formed by the first to third orifice forming members 15, 16, 17.

The upper orifice 26 is an annular passage formed between the first orifice forming member 15 and the second orifice forming member 16, and a communicating hole 15a is formed in the first orifice forming member 15 on one side of a bulkhead 26a provided in the upper orifice 26 and a communicating hole 16a is formed in the second orifice forming member 16 on the other side of the bulkhead 26a. Thus, the upper orifice 26 is formed so as to extend substantially along the full circumference from the communicating hole 15a in the first orifice forming member 15 to the communicating hole 16a in the second orifice forming member 16 (refer to FIG. 2).

The lower orifice 27 is an annular passage formed between the second orifice forming member 16 and the third orifice forming member 17, and the communicating hole 16a is formed in the second orifice forming member 16 on one side of a bulkhead 27a formed in the lower orifice 27 and a communicating hole 17a is formed in the third orifice forming member 17 on the other side of the bulkhead 27a. Thus, the lower orifice 27 is formed so as to extend substantially along the full circumference from the communicating hole 16a in the second orifice forming member 16 and the communicating hole 17a in the third orifice forming member 17 (refer to FIG. 3). As is clear from what has been described hereunto, the first liquid chamber 24 and the second liquid chamber 25 are allowed to communicate with each other via the upper orifice 26 and the lower orifice 27 which are connected in series.

Fixed in the caulk fixed portion 13a of the outer barrel 13 is an annular mounting bracket 28 for fixing the active vibration isolating support device M to the vehicle body frame F, and welded to a lower side of this mounting bracket 28 is an actuator supporting member 30 for supporting an actuator 29 for driving the movable member 20.

A yoke 32 is fixed to the actuator supporting member 30, and a coil 34 wound around a bobbin 33 is accommodated in a space formed in the yoke 32 and is secured therein with a spring washer 35. A bearing 35 is fitted from below in a barrel-like portion 32a in the yoke 32 which is fitted in a inner circumference in the annular coil 34 and is secured with a threaded lid 37. A shaft portion 38a extending downwardly from the center of a disc-like armature 38 facing an upper side of the coil 34 is supported on the bearing 35 in such a manner to freely slide along vertical directions.

A connecting rod 39 is loosely fitted in an upper portion of the shaft portion 37a of the armature 38 with a gap α being provided between the connecting rod 39 and the upper portion of the shaft portion 38a, and a bolt 40 extending vertically upwardly through the connecting rod 39 is fastened in the movable member 20. A head 40a of the bolt 40 is urged upwardly by a coil spring 41 disposed between a bottom of the bearing 35 and the head 40a. The head 40a fits in a stepped portion 38b formed in the inner circumferential surface of the shaft portion 38a. A saucer spring 42 is disposed between a stepped portion 39a formed in the connecting rod 39 and an upper side of the shaft portion 38a. Thus, the connecting rod 39, made integral with the movable member 20 is coupled to the armature 38 by virtue of the spring-back force of the coil spring 41 and the saucer spring 42, and when a biassed load is applied as indicated by arrows in FIG. 4, the connecting rod 39 can sway so as to deviate from the axis L.

The spring-back force of the coil spring 41 is applied upwardly to the armature 38 via the head 40a of the bolt 40 when the coil 34 of the actuator 29 is demagnetized, while the pressure form the liquid and the spring-back force of the second elastic body 18 are applied thereto downwardly, whereby the armature 38 stays at a neutral position where those upward and downward forces balance with each other.

In this state, an air gap β is formed between a conical stopper surface 32b formed in an upper opening in the yoke 32 and a conical stopper surface 38c formed in the outer circumference of the armature 38 so as to face the conical stopper surface 32b.

Thus, when low-frequency engine shake vibrations are generated while an automobile is running and the first elastic body 14 deforms due to a load inputted from the engine E to change the capacity of the first liquid chamber 24, the liquid communicates between the first liquid chamber 24 and the second liquid chamber 25 via the upper orifice 26 and the lower orifice 27. When the capacity of the first liquid chamber 24 is increased/decreased, the capacity of the second liquid chamber 25. is accordingly decreased/increased, but this change in capacity of the second liquid chamber 25 is absorbed by the diaphragm 22 through elastic deformation thereof. When this occurs, since the configurations and sizes of the upper orifice 26 and the lower orifice 27 and the spring constant of the first elastic body 14 are set so as to exhibit a high spring constant and a high damping force in the frequency area of the engine shake vibrations, it is possible to effectively reduce vibrations transmitted from the engine E to the vehicle body frame F.

The actuator 29 is held in a non-operational state in the frequency area of the aforesaid engine shake vibrations.

When vibrations in a frequency higher than the engine shake vibrations, or idling vibrations or booming noise vibrations attributed to the rotation of a crankshaft of the engine E occur, since the liquid inside the upper orifice 26 and the lower orifice 27 which connect the first liquid chamber 24 with the second liquid chamber 25 sticks to thereby provide no vibration isolating function, the actuator 29 is then driven to provide the vibration isolating function.

The electronic control unit U controls the excitation of the coil 34 of the actuator 29 based on signals from the engine speed sensor S1, the load sensor S2 and the acceleration sensor S3. Specifically, when the engine E is deviated downwardly by vibrations and the capacity of the first liquid chamber 24 is reduced to thereby increase the liquid pressure, the coil 34 is excited so as to attract the armature 38. As a result of this, the armature 38 moves downwardly together with the movable member 20 while compressing the coil spring 41 and deforms downwardly the second elastic body 18 connected to the first liquid chamber 24 at the inner circumference thereof. This increases the capacity of the first liquid chamber 24 to thereby suppress the increase in liquid pressure, whereby the active vibration isolating support device M is allowed to generate an active supporting force for preventing the downward load transmission from the engine E to the vehicle body frame F.

On the contrary, when the engine E is deviated upwardly due to vibrations and the capacity of the first liquid chamber 24 is increased to thereby reduce the liquid pressure, the coil 34 is demagnetized and the attraction of the armature is released. As a result of this, the armature 38 moves upwardly together with the movable member 20 by virtue of the spring-back force of the coil spring 41 and deforms upwardly the second elastic body 18 connected to the movable member 20 at the inner circumference thereof. This decreases the capacity of the first liquid chamber 24 to thereby suppress the decrease in liquid pressure, whereby the active vibration isolating support device M is allowed to generate an active supporting force for preventing the upward load transmission from the engine E to the vehicle body frame F.

Then, since the armature 38, which is adapted to reciprocate in vertical directions while the actuator is in operation, is supported slidably at the shaft portion 38a by the bearing 36 fixed to the yoke 32, the transverse vibration of the armature 38 is prevented, whereby the armature 38 can be held in a proper posture in which it stays along the axis L. This then allows an air gap smaller than the air gap β to be set between the armature 38 and the yoke 32, whereby the coil 34 can be miniaturized as small as required to thereby save the power consumption.

In addition, even if a transversely biassed load is applied to the second elastic body 18 and the diaphragm 22 from the liquid when the movable member 20 reciprocates in vertical directions, since the gap α is formed between the connecting rod 39 made integral with the movable member 20 which supports the second elastic body 18 and the diaphragm 22 and the shaft portion 38a of the armature 38, the connecting rod 39 is allowed to sway in directions as indicated by the arrows in FIG. 4 while deforming the coil spring 41 and the saucer spring 42. This prevents the direct transmission of the vibration of the movable member 20 to the armature 38, whereby wear of the bearing 36 supporting the shaft portion 38a of the armature 38 is prevented, thereby making it possible to improve both the durability and the reliability of the actuator 29.

Figure 5:
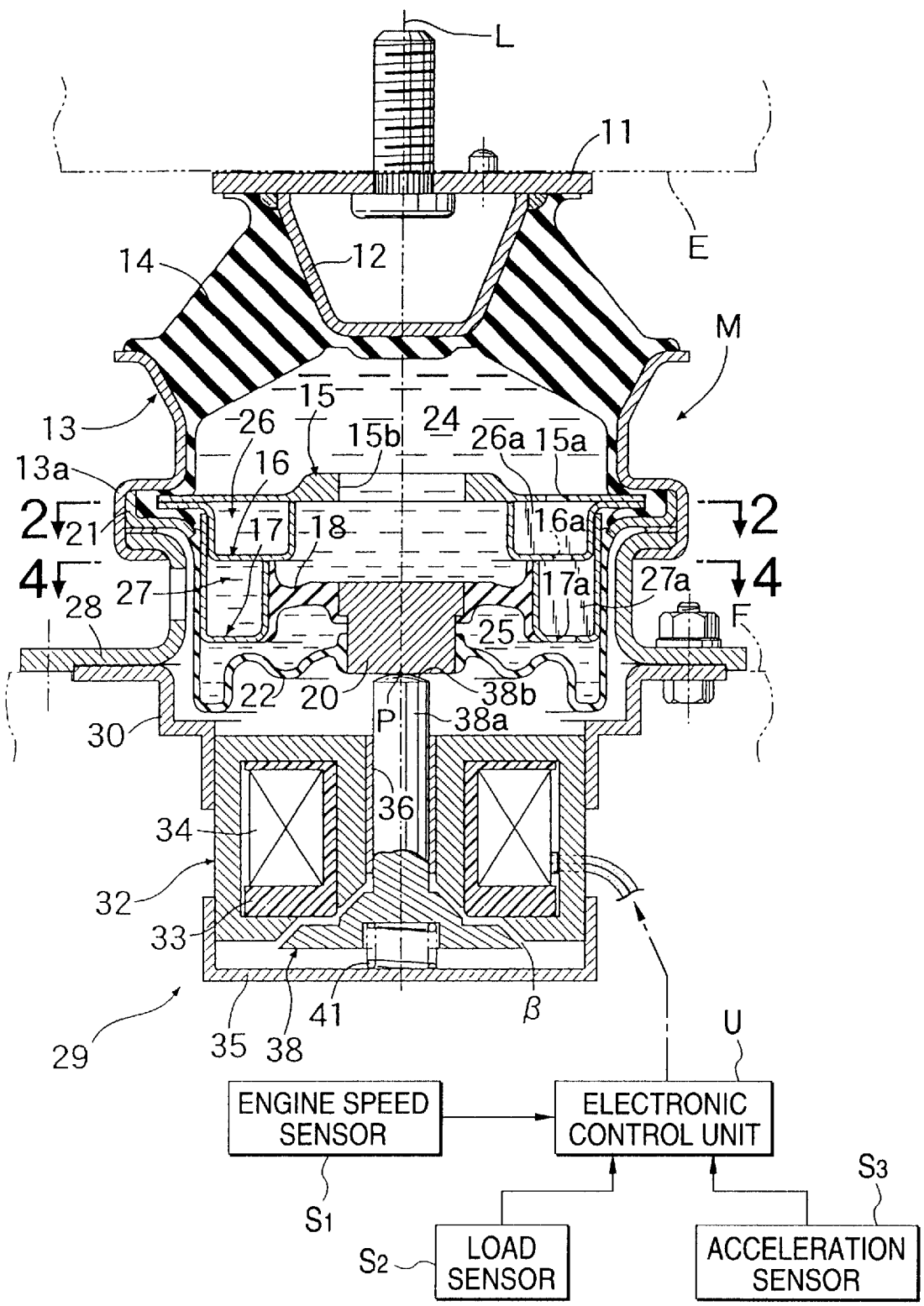
FIG. 5 is a vertical sectional view of an active vibration isolating support device according to a second mode for carrying out the invention.
Figure 6:
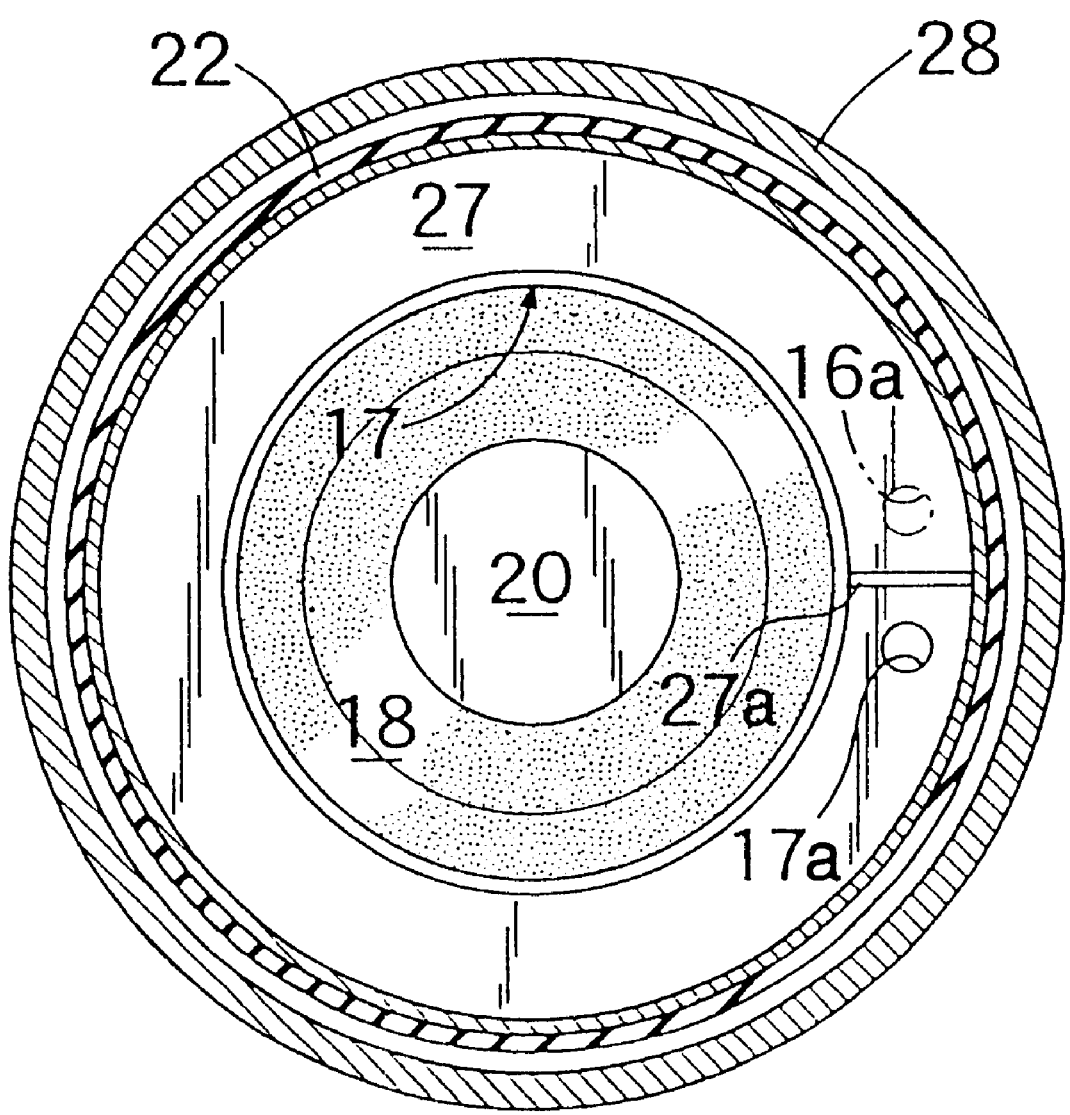
FIG. 6 is a cross-sectional view taken along the line 4—4 of FIG. 5.
Figure 7:
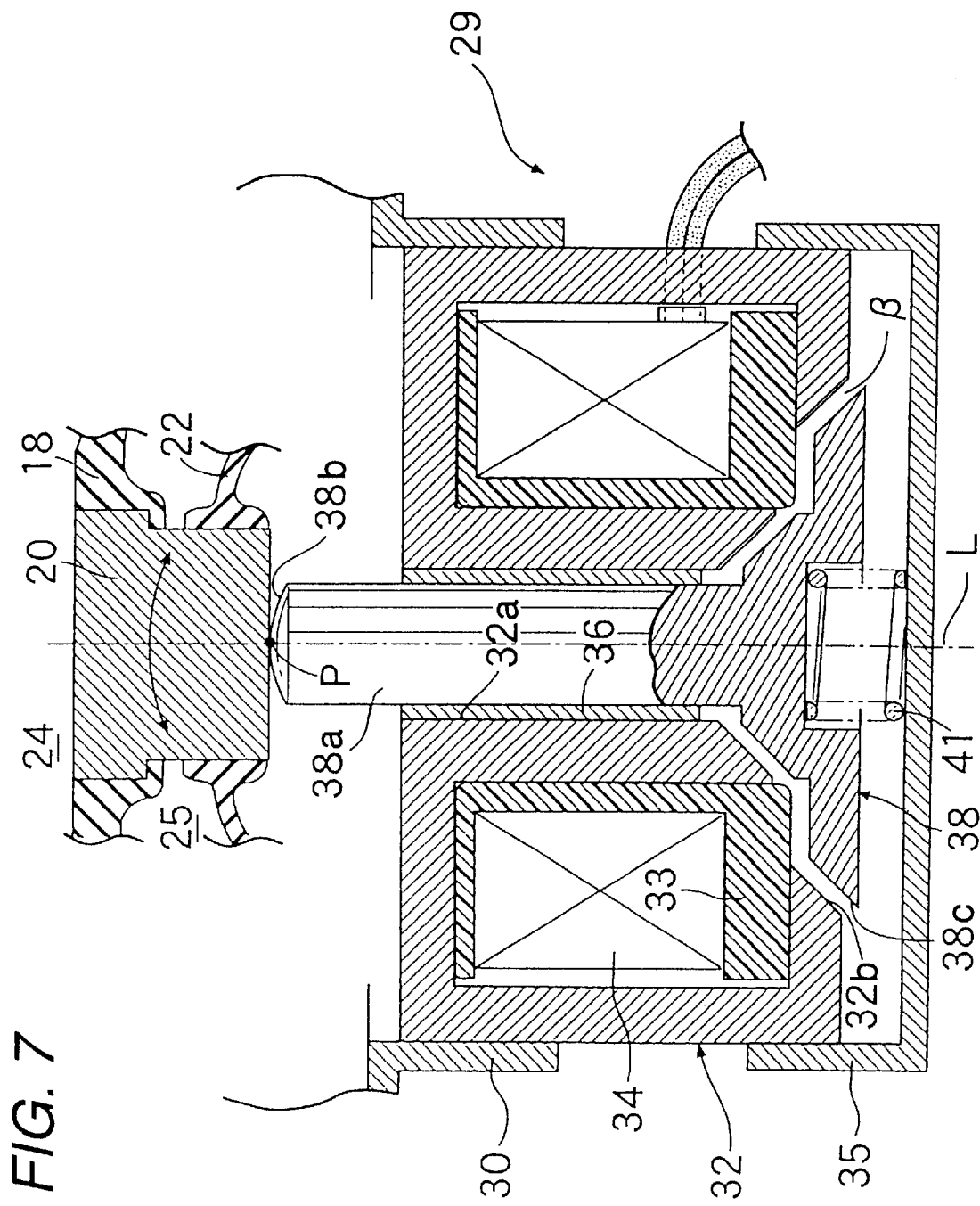
FIG. 7 is an enlarged view of a main part of FIG. 5.

FIGS. 5 to 7 show a second mode for carrying out the invention or a second embodiment of the invention, in which FIG. 5 is a vertical sectional view of an active vibration isolating support device, FIG. 6 is a cross-sectional view taken along the line 4—4 of FIG. 5, and FIG. 7 is an enlarged view showing a main part of FIG. 5. A cross-sectional view taken along the line 2—2 of FIG. 5 is identical to the cross-sectional view shown in FIG. 1 which is discussed with respect to the first mode for carrying out the invention.

The second embodiment is identical to the first embodiment of the invention in the basic construction, and therefore, only different features will be described below. A second elastic body 18 formed of a rubber film is fixed at the outer circumference thereof through vulcanization bonding to the inner circumference of a third orifice forming member 17, and a second elastic body 18 is also fixed at the inner circumference thereof through vulcanization bonding to a movable member 20 disposed vertically movably on an axis L. A diaphragm 22 is fixed at the outer circumference thereof through vulcanization bonding to a ring member 21 fixed to a caulk fixed portion 13a of an outer barrel 13, and the diaphragm 22 is also fixed at the inner circumference thereof through vulcanization bonding to the movable member 20.

A yoke 32 is fixed to a actuator supporting member 30 and a coil 34 wound around a bobbin 33 is accommodated in the space formed in the interior of the yoke 32. A cylindrical bearing 36 is fitted in a supporting hole 32a extending through the center of the yoke 32 so as to be fixed in place thereat. A pillar-like shaft portion 38a extending upwardly from the center of a armature 38 facing the lower side of the coil 34 is supported on the bearing 36 vertically slidably.

The armature 38 is urged upwardly by a coil spring 41 disposed between a bottom plate 35 fixed to the lower side of the yoke 32 and itself, a spherical surface portion 38b formed at an upper end of the shaft portion 38a is brought into spring-back abutment with a lower side of the movable member 20. In other words, the shaft portion 38a of the armature 38 and the movable member 20 are brought into point contact with each other via a contact portion P, whereby the movable member 20 is allowed to oscillate and slide relative to the armature 38. The spring-back force of the coil spring 41 is upwardly applied to the shaft portion 38a of the armature 38 when the coil 34 of an actuator 29 demagnetizes, whereas the pressure from the liquid and the spring-back force of the second elastic body 18 are applied downwardly thereto, and the shaft portion 38a of the armature 38 stays at a neutral position where the upward and downward forces balance. In this state, an air gap β is formed between a conical stopper surface 32b formed in an opening in a lower side of the yoke 32 and a conical stopper surface 38c formed in the outer circumference of the armature 38 so as to face the stopper surface 32b.

Thus, when low-frequency engine shake vibrations are generated while an automobile is running and the first elastic body 14 deforms due to a load inputted from the engine E to change the capacity of the first liquid chamber 24, the liquid communicates between the first liquid chamber 24 and the second liquid chamber 25 via the upper orifice 26 and the lower orifice 27. When the capacity of the first liquid chamber 24 is increased/decreased, the capacity of the second liquid chamber 25 is accordingly decreased/increased, but this change in capacity of the second liquid chamber 25 is absorbed by the diaphragm 22 through elastic deformation thereof. When this occurs, since the configurations and sizes of the upper orifice 26 and the lower orifice 27 and the spring constant of the first elastic body 14 are set so as to exhibit a high spring constant and a high damping force in the frequency area of the engine shake vibrations, it is possible to effectively reduce vibrations transmitted from the engine E to the vehicle body frame F.

The electronic control unit U controls the excitation of the coil 34 of the armature 29 based on signals from the engine speed sensor S1, the load sensor S2 and the acceleration sensor S3. Specifically, when the engine E is deviated upwardly by vibrations and the capacity of the first liquid chamber 24 is increased to thereby decrease the liquid pressure, the coil 34 is excited so as to attract the armature 38. As a result of this, the armature 38 moves upwardly to press against the movable member 20 at the spherical surface portion 38b at the upper end of the shaft portion 38a and deforms upwardly the second elastic body 18 connected to the first liquid chamber 24 at the inner circumference thereof. This decreases the capacity of the first liquid chamber 24 to thereby suppress the decrease in liquid pressure, whereby the active vibration isolating support device M is allowed to generate an active supporting force for preventing the upward load transmission from the engine E to the vehicle body frame F.

On the contrary, when the engine E is deviated downwardly due to vibrations and the capacity of the first liquid chamber 24 is decreased to thereby increase the liquid pressure, the coil 34 is demagnetized and the attraction of the armature is released. As a result of this, the armature 38 pressed by the movable member 20 being moved downwardly due to the liquid pressure moves downwardly against the spring-back force of the coil spring 41 and deforms downwardly the second elastic body 18 connected to the movable member 20 at the inner circumference thereof. This increases the capacity of the first liquid chamber 24 to thereby suppress the increase in liquid pressure, whereby the active vibration isolating support device M is allowed to generate an active supporting force for preventing the downward load transmission from the engine E to the vehicle body frame F.

In addition, even if the second elastic body 18 and the diaphragm 22 are inclined in directions as indicated by arrows in FIG. 7 when a transversely biassed load is applied thereto from the liquid when the movable member 20 reciprocates in vertical directions, since the movable member 20 and the shaft portion 38a of the armature 38 are in point contact with each other at the contact portion P such that they can be displaced relative to each other, the movable member 20 is allowed to sway freely without affecting the armature 38. This prevents the direct transmission of the vibration of the movable member 20 to the armature 38, whereby wear of the bearing 36 supporting the shaft portion 38a of the armature 38 is prevented, thereby making it possible to improve both the durability and the reliability of the actuator 29.

In the description of the above second mode for carrying out the invention, like reference numerals are imparted to like members or members having like functions to those described in the first mode for carrying out the invention, and the detailed description thereof has been omitted.

Figure 8:
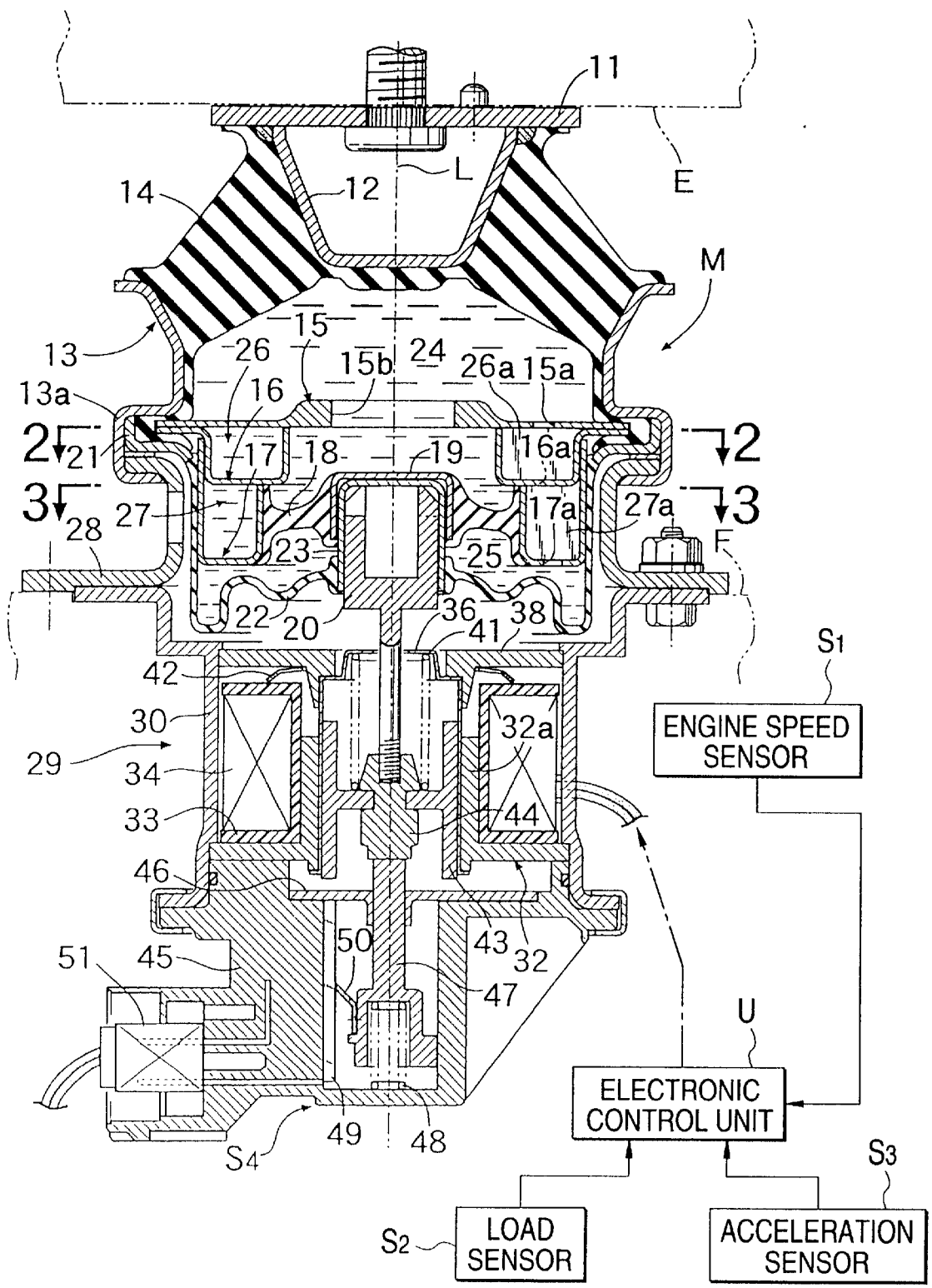
FIG. 8 is a vertical sectional view of an active vibration isolating support device according to a third mode for carrying out the invention.
Figure 9:
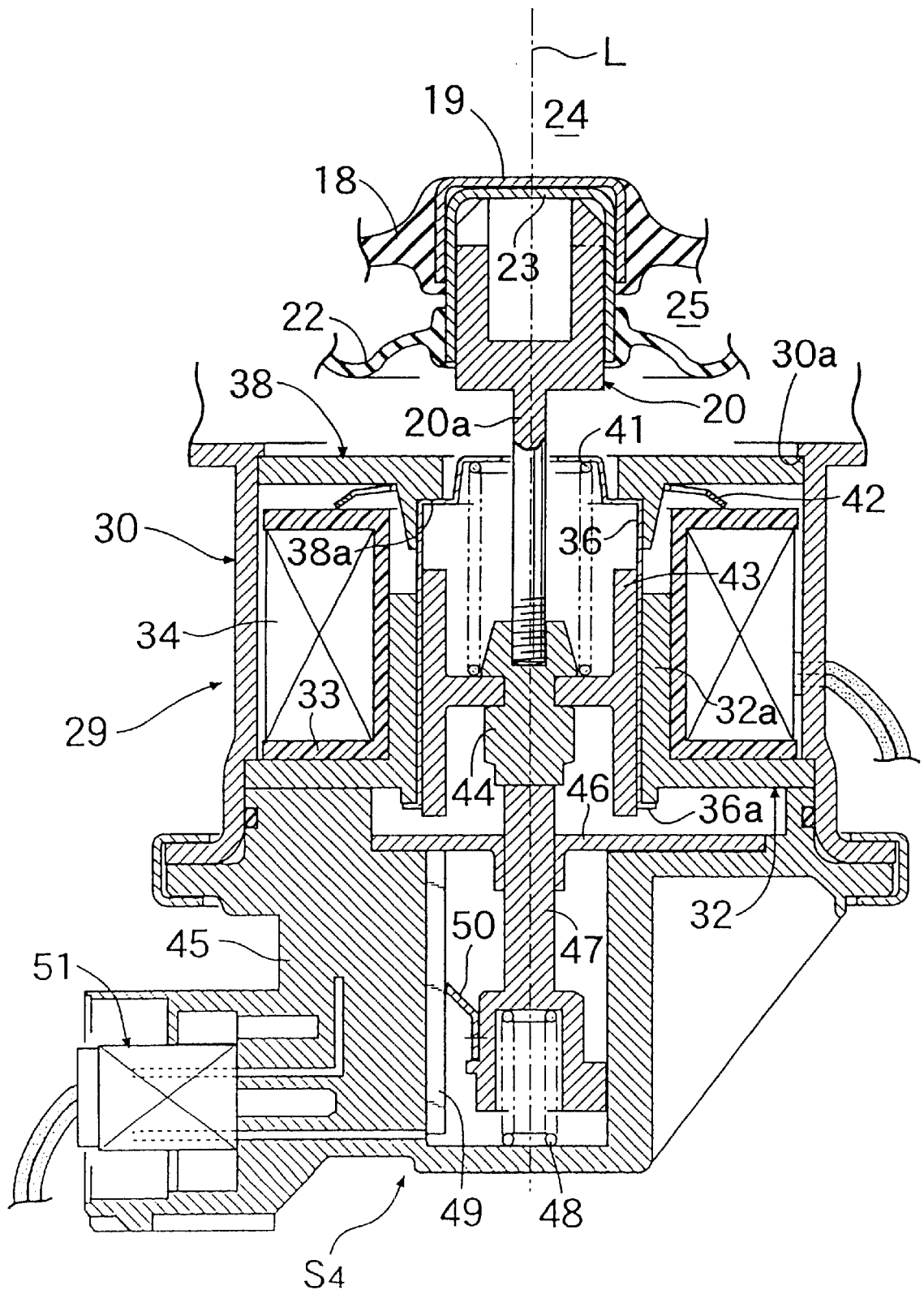
FIG. 9 is an enlarged view of a main part of FIG. 8.
Figure 10:
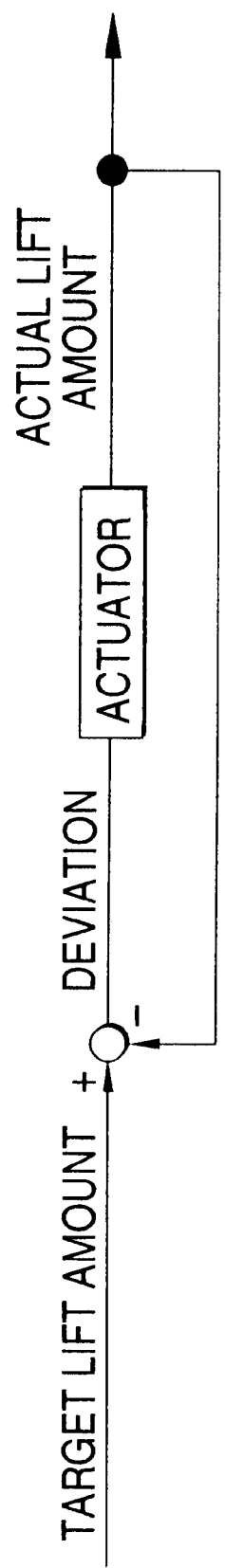
FIG. 10 is a block diagram of a control system of an actuator for the third mode for carrying out the invention.

FIGS. 8 to 10 show a third mode for carrying out the invention. FIG. 8 is a further vertical sectional view of an active vibration isolating support device. A cross-sectional view taken along the line 2—2 of FIG. 8 is identical to that shown in FIG. 2 and a cross-sectional view taken along the line 3—3 of FIG. 8 is identical to that shown in FIG. 3. FIG. 9 is an enlarged view showing a main part of FIG. 8, and FIG. 10 is a block diagram of a control system for an actuator.

The third mode for carrying out the invention is basically identical to the first mode for carrying out the invention in construction. Thus, only different features will be described below. In the following description of the third mode of the invention, like reference numerals are imparted to like members or members having like functions to those described in the first mode of the invention previously, and therefore, the detailed description thereof will be omitted.

An active vibration isolating support device M according to the third mode for carrying out the invention shown in FIGS. 8 and 9 is intended to be used for elastically supporting an engine E to a vehicle body frame F of an automobile and is controlled by an electronic control unit U to which are connected an engine speed sensor S1 for detecting the engine speed, a load sensor S2 for detecting a load inputted in the active vibration isolating support device M, an acceleration sensor S3 for detecting an acceleration applied to the engine E and a lift amount sensor S4 for detecting the lift mount of a movable member 20 of an actuator 29, which will be described later.

An annular mounting bracket 28 is fixed at a caulk fixed portion 13a of an outer barrel 13 for fixing the active vibration isolating support device M to the vehicle body frame F, and an actuator housing 30 constituting the outline of the actuator 29 for driving the movable member 20 is welded to a lower side of the mounting bracket 28.

A yoke 32 is fixed to the actuator housing 30, and a coil 34 wound around a bobbin 33 is accommodated in a space surrounded by the actuator housing 30 and the yoke 32. A bottomed barrel-like bearing 36 is inserted from below into a barrel-like portion 32a of the yoke 32 which fits in an inner circumference of the annular coil 34 and is positioned when a locking portion 36a at a lower end thereof is brought into engagement with a lower end of the yoke 32. A disc-like armature 38 facing an upper side of the coil 34 is supported slidably on an inner circumferential surface of the actuator housing 30, and a stepped portion 38a formed in an inner circumferential surface of the armature 38 is brought into engagement with an upper end of the bearing 36. The armature 38 is upwardly urged by a coned disc spring 42 disposed between the upper side of the coil 34 and itself and is positioned when it is brought into engagement with a locking portion 30a provided on the actuator housing 30.

A cylindrical slider 43 is slidably fitted within an inner circumference of the bearing 36, and a shaft portion 20a extending downwardly from the movable member 20 loosely penetrates through an upper bottom portion of the bearing 36 and is connected to a boss 44 fixed in the interior of the slider 43. A coil spring 41 is disposed between the upper bottom portion of the bearing 36 and the slider 43, and the bearing 36 is urged upwardly by this coil spring 41, whereas the slider is urged downwardly by the same spring.

The lift amount sensor S4 provided below the actuator 29 comprises a sensor housing 45 fixed to a lower end of the actuator housing 30. A sensor rod 47 is slidably supported on a guide member 46 fixed in the interior of the sensor housing 45 and is urged upwardly with a coil spring 48 provided between a bottom portion of the sensor housing 45 and itself so as to be brought into abutment with the boss 44 of the slider 43. A contact 50 fixed to the sensor rod 47 is brought into contact with a resistor 49 fixed in the interior of the sensor housing 45. An electrical resistance value between a lower end of the resistor 49 and the contact 50 is inputted into the electronic control unit U via a connector 51. Since the lift amount of the movable member 20 is identical to the travelling distance of the contact 50, the lift amount of the movable member 20 can be detected based on the electrical resistance value.

When the coil 34 of the actuator 29 demagnetizes, the spring-back force of the coil spring 41 is applied downwardly to the slider 43 slidably supported on the bearing 36, whereas the spring-back force of the coil spring 48 is applied thereto upwardly via the sensor rod 47 and the boss 44, whereby the slider stays at a neutral position where the spring-back forces of the both coil springs 41, 48 balance. When the coil 34 is excited from this state to attract the armature 38 downwardly, the bearing 36 is pushed on by the stepped portion 38a to thereby slide downwardly, further, to thereby compress the coil spring 41. As a result of this, since the spring-back force of the coil spring 41 is increased and the slider 43 is lowered, the movable member 20 is also lowered which is connected to the slider 43 via the boss 44 and the shaft portion 20a, and this causes the second elastic body 18 connected to the movable member 20 to deform downwardly to thereby increase the capacity of the first liquid chamber 24. On the contrary, when the coil 34 is demagnetized, the movable member 20 is raised to cause the second elastic member 18 to deform upwardly, reducing the capacity of the first liquid chamber 24.

The electronic control unit U controls the excitation of the coil 34 of the armature 29 based on signals from the engine speed sensor S1, the load sensor S2, the acceleration sensor S3 and the lift amount sensor S4. Specifically speaking, when the engine E is deviated downwardly by vibrations and the capacity of the first liquid chamber 24 is reduced to thereby increase the liquid pressure, the coil 34 is excited so as to attract the armature 38. As a result of this, the armature 38 moves downwardly together with the movable member 20 while compressing the coil spring 41 and deforms downwardly the second elastic body 18 connected to the movable member 20 at the inner circumference thereof. This increases the capacity of the first liquid chamber 24 to thereby suppress the increase in liquid pressure, whereby the active vibration isolating support device M is allowed to generate an active supporting force for preventing the downward load transmission from the engine E to the vehicle body frame F.

On the contrary, when the engine E is deviated upwardly due to vibrations and the capacity of the first liquid chamber 24 is increased to thereby reduce the liquid pressure, the coil 34 is demagnetized and the attraction of the armature 38 is released. As a result of this, the armature 38 moves upwardly together with the movable member 20 by virtue of the spring-back force of the coil spring 41 and deforms upwardly the second elastic body 18 connected to the movable member 20 at the inner circumference thereof. This decreases the capacity of the first liquid chamber 24 to thereby suppress the decrease in liquid pressure, whereby the active vibration isolating support device M is allowed to generate an active supporting force for preventing the downward load transmission from the engine E to the vehicle body frame F.

As is clear from FIG. 10, a target lift amount calculated by the electronic unit U based on the outputs from the engine speed sensor S1, the load sensor S2 and the acceleration sensor S3 is compared to an actual lift amount detected by the lift amount sensor S4, and the operation of the actuator 29 is feedback controlled such that a deviation between the target lift amount and the actual lift is converged to 0. At this time, in a case where the movable member 20 sticks due to the failure of the actuator 29 or a required lift amount is produced due to the deterioration of the actuator 29, since the aforesaid deviation exceeds a predetermined threshold value, an abnormal state of the actuator 29 can be detected. Moreover, it is possible to feedback control the lift amount of the movable member 20 precisely by detecting an actual lift amount of the movable member 20 with the lift amount sensor S4.

Thus, while the first to third modes for carrying out the invention have been described in detail heretofore, the invention may be modified in design in various ways without departing from the sprit and scope of thereof.

For instance, in the respective modes of the invention described above, the invention has been described as being applied to the active vibration isolating support device M for supporting the engine E of the automobile, but the active vibration isolating support device M of the invention may be adopted for supporting other vibratory bodies such as machine tools or the like. In addition, in a case where vibrations in the engine shake area do not need to be reduced by means of the active vibration isolating support device, it is possible to omit the second liquid chamber 25, the upper orifice 26, the lower orifice 27 and the diaphragm 22.

According to the invention described in the first mode for carrying out the invention, since the armature of the actuator is supported by the bearing, the vibration of the armature can be prevented, whereby an optimum air gap can be set for the actuator, thereby making it possible to miniaturize the coil to thereby reduce the power consumption. Moreover, since the armature and the movable member are connected to each other in a flexible fashion, and are accommodated to be bent even if there occurs a vibration of the movable member due to the load imparted by the liquid chamber, the vibration is not directly transmitted to the armature, whereby biassed wearing of the bearing can be prevented, thereby making it possible to improve the durability and reliability of the actuator.

According to the invention described in the second mode for carrying out the invention, since the armature of the actuator is supported by the bearing, the vibration of the armature can be prevented, whereby the optimum air gap can be set for the actuator and consequently, the coil can be miniaturized to thereby reduce the power consumption. Moreover, since the armature and the movable member are brought into contact with each other via the contact portion such that they can be displaced relative to each other, even if the vibration of the movable member is generated by the load imparted thereto by the liquid chamber, the vibration is constructed so as not to directly be transmitted to the armature, whereby the biassed wear of the bearing can be prevented, thereby making it possible to improve the durability and reliability of the actuator. Furthermore, since the armature press drives the movable member via the contact portion, the deviation of the armature from the movable member can be prevented, whereby the movable member can securely be driven.

According to the invention described in the third mode for carrying out the invention, since the active vibration isolating support device detects the operational amount of actuator by means of the operational amount detecting means, not only can an abnormal state be securely detected in which the actuator fails and becomes out of order or in which the actuator becomes deteriorated and the operational amount thereof is reduced but also a feedback control can be performed in which a detected operational amount is made to coincide with a target value.

What is claimed is:

1. An active vibration isolating support device comprising:

an elastic body for bearing a load of a vibratory body;

a liquid chamber at least partially constituted by said elastic body;

a movable member adapted to change a capacity of said liquid chamber;

an armature connected to said movable member so that said movable member is tiltable relative to said armature;

an actuator for driving said armature, wherein said actuator moves said movable member in accordance with an operating condition of an engine;

a housing connected to said elastic body to accommodate the liquid chamber therein; and a diaphragm extending from an outer periphery of said movable member to said housing, said diaphragm at least partially constituting the liquid chamber.

2. The active vibration isolating support device according to claim 1, further including a contact portion disposed on said armature, wherein said armature and said movable member are contacted to each other at said contact portion in such a relationship of relative displacement.

3. The active vibration isolating support device according to claim 2, wherein said armature is adapted to press drive said movable member via said contact portion when said armature is attracted by said actuator.

4. The active vibration isolating support device according to claim 1, wherein said actuator comprises a coil producing an electromagnetic force.

5. The active vibration isolating support device according to claim 1, further including a lift amount sensor for detecting an actual lift amount of said movable member.

6. The active vibration isolating support device according to claim 2, wherein said armature and said movable member are point contacted to each other at said contact portion.

7. The active vibration isolating support device according to claim 1, further comprising:

a connecting member disposed between said armature and said movable member, wherein said connecting member and said movable member are mutually accommodated to be freely bent.

\* \* \* \* \*